United States Patent
Junginger et al.

(10) Patent No.: US 11,023,548 B2
(45) Date of Patent: *Jun. 1, 2021

(54) FACETED SEARCHING OF RESOURCES VIA A WEB APPLICATION

(71) Applicant: International Business Machines Corporation, Armonk, NY (US)

(72) Inventors: Michael Junginger, Weissenhorn (DE); Stefan Liesche, Boeblingen (DE); Andreas Nauerz, Stuttgart (DE); Sascha Sambale, Stuttgart (DE); Thomas Steinheber, Stuttgart (DE); Thomas Stober, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 294 days.

This patent is subject to a terminal disclaimer.

(21) Appl. No.: 16/109,948

(22) Filed: Aug. 23, 2018

(65) Prior Publication Data

US 2018/0365329 A1    Dec. 20, 2018

Related U.S. Application Data

(63) Continuation of application No. 14/479,918, filed on Sep. 8, 2014, now Pat. No. 10,114,896.

(30) Foreign Application Priority Data

Sep. 9, 2013  (GB) .................................... 1315966

(51) Int. Cl.
*G06F 16/9535* (2019.01)
(52) U.S. Cl.
CPC .............................. *G06F 16/9535* (2019.01)

(58) Field of Classification Search
CPC .................................................. G06F 16/9535
See application file for complete search history.

(56) References Cited

U.S. PATENT DOCUMENTS

| | | | |
|---|---|---|---|
| 7,693,877 B1 | 4/2010 | Zasman | |
| 8,078,628 B2 | 12/2011 | Erera et al. | |

(Continued)

FOREIGN PATENT DOCUMENTS

CN         103313090 A      9/2013

OTHER PUBLICATIONS

Ferre, Sebastien et al.: "Semantic Search: Reconciling Expressive Querying and Exploratory Search"; Lecture Notes in Computer Science; vol. 7031; 2011; pp. 177-192.

(Continued)

*Primary Examiner* — Hau H Hoang
(74) *Attorney, Agent, or Firm* — Cantor Colburn LLP; Reza Sarbakhsh (57) ABSTRACT

A computer implemented method for searching resources via an application in a user interface framework that initiates a first search request via a search engine interface and receives a search result and associated resource types in response to the first search request. The method further maps the associated resource types to at least one user interface control class of a plurality of user interface control classes resulting in at least one selected class group and dynamically maps the at least one selected class group to a corresponding instance of user interface controls. The method further renders the search result and the corresponding instance into a faceted user interface, receives an input via the corresponding instance rendered into the faceted user interface, filters the search result based on the input to generate a filtered search result, and renders the filtered search result into the faceted search interface.

20 Claims, 6 Drawing Sheets

(56) References Cited

U.S. PATENT DOCUMENTS

| | | | |
|---|---|---|---|
| 8,161,044 | B2 | 4/2012 | Blackwell et al. |
| 8,244,757 | B2 | 8/2012 | Karlson et al. |
| 8,713,064 | B1 | 4/2014 | Khafizov et al. |
| 9,594,540 | B1 | 3/2017 | Stasior |
| 10,114,896 | B2 | 10/2018 | Junginger et al. |
| 2004/0133413 | A1 | 7/2004 | Beringer |
| 2006/0004820 | A1 | 1/2006 | Claudatos et al. |
| 2008/0147635 | A1 | 6/2008 | Im |
| 2008/0306928 | A1 | 12/2008 | Brunner |
| 2010/0211559 | A1 | 8/2010 | De Morentin Martinez et al. |
| 2011/0252013 | A1 | 10/2011 | Lempel et al. |
| 2012/0072432 | A1 | 3/2012 | Crosa et al. |
| 2012/0173521 | A1 | 7/2012 | Lam |
| 2012/0203766 | A1 | 8/2012 | Hornkvist et al. |
| 2014/0172821 | A1* | 6/2014 | Hu .................. G06F 16/9535 707/711 |
| 2015/0074074 | A1 | 3/2015 | Junginger et al. |

OTHER PUBLICATIONS

IBM "Facet Clustering Using Multi-Dimension Facets", IPCOM000188106D; retrieved at: https://priorart.ip.com/IPCOM/000188106; Publication Date; Sep. 22, 2009; 3 pgs.

Lemieux, Stephanie "Designing for Faceted Search" UX Articles by UIE; published in KM World, Mar. 1, 2009; retrieved at: https://articles.uie.com/faceted_search/; downloaded Sep. 22, 2020; 11 pgs.

Sacco et al. "Dynamic Taxonomies and Faceted Search"; The Information Retrieval Series; vol. 25; 2009; ISBN: 978-3-642-02358-3; pp. 47.

IBM "List of IBM Patents or Patent Applications Treated as Related (Appendix P)", Date Filed: Nov. 9, 2020; 2 pages.

* cited by examiner

100 — method for searching resources 102 initiating a first search request 104 receiving a search result 106 mapping the received associated resource types to at least one class of user interface controls 108 dynamically mapping a selected group of classes of user interface controls to corresponding instances of user interface controls 110 rendering the search result and the dynamically mapped, corresponding instance of the user interface controls 112 receive input 114 filtering the received search result 116 rendering the filtered received search result and the facetted search interface

FACETED SEARCHING OF RESOURCES VIA A WEB APPLICATION

DOMESTIC AND FOREIGN PRIORITY

This application is a Continuation of U.S. application Ser. No. 14/479,918, entitled "FACETED SEARCHING OF RESOURCES VIA A WEB APPLICATION", filed Sep. 8, 2014, which is a U.S. Counterpart Application of United Kingdom Application No. 1315966.0, entitled "COMPUTER IMPLEMENTED METHOD FOR SEARCHING RESOURCES VIA A WEB APPLICATION", filed Sep. 9, 2013, which is incorporated herein by reference in their entireties.

BACKGROUND

The disclosure relates generally to searching resources via an application, and more specifically, to searching resources via a web application in a user interface framework.

The vast amount of information being offered by web-based systems has increased and accelerated the demand for more sophisticated search techniques. Earlier search engines more or less catalogued systems that were maintained manually. Since the increasing number of sites manual maintenance quickly became infeasible and automatic cataloguers also arose. A breakthrough of web search engines came with the first full-text automatic crawlers that indexed websites fully automatically and that made them available to people searching for content by specifying search keywords. The results were simply based on a match between terms in the index and the specified search keywords. An important aspect was how to determine the order of relevance. Today, prominent and successful search engines facilitate algorithms to determine the order of relevancy. Simply spoken, the more pages pointing to a page, the more relevant the page is considered to be.

Even though market leaders are continuously improving their algorithms, the number of results being returned from search requests is becoming larger and larger as the information space continues to grow. End-users suffer as finding the best results becomes more difficult.

Faceted searches represent a promising technology for making information filtering more efficient. It enables users to filter millions of results along multiple criteria or dimensions and thus, to explore information spaces by applying multiple filters at once. Faceted searches usually rely on a display of multiple user interface (UI) controls that enable users to perform the multi-criteria filtering.

One document disclosing facet-based filtering is US 2012/0072432A1. It discloses a network update interface to a user on a network to display network updates from other users of a mutual social-networking site. The network updates shared by the other users are gathered in a stream and supplied to a facet-filtering system including a network update interface.

Document US2012/0173521A1 discloses methods for dynamically ordering facets for a search results presentation. Facets specific to a query are determined and facet orderings are dynamically generated.

Unfortunately, faceted searches only work well when the kind and characteristics of resources are well known—a prerequisite often not being fulfilled. Today, there is no reliable identification mechanism for identifying the kind of resource.

SUMMARY

According to one embodiment of the present invention, a computer implemented method for searching resources via an application in a user interface framework includes initiating a first search request via a search engine interface; receiving a search result and associated resource types in response to the first search request; mapping the associated resource types to at least one user interface control class of a plurality of user interface control classes resulting in at least one selected class group; dynamically mapping the at least one selected class group to a corresponding instance of user interface controls; rendering the search result and the corresponding instance into a faceted user interface; receiving an input via the corresponding instance rendered into the faceted user interface; filtering the search result based on the input to generate a filtered search result; and rendering the filtered search result into the faceted search interface.

According to another embodiment of the present invention, a system for searching resources via an application in a user interface framework, comprising a processing unit and a memory, is configured to initiate a first search request via a search engine interface; receive a search result and associated resource types in response to the first search request; map the associated resource types to at least one user interface control class of a plurality of user interface control classes resulting in at least one selected class group; dynamically map the at least one selected class group to a corresponding instance of user interface controls; render the search result and the corresponding instance into a faceted user interface; receive an input via the corresponding instance rendered into the faceted user interface; filter the search result based on the input to generate a filtered search result; and render the filtered search result into the faceted search interface.

According to another embodiment of the present invention, a computer program product for searching resources via an application in a user interface framework, comprises a computer readable storage medium having program instructions embodied therewith, where the program instructions are executable by a processor and cause the computer to perform initiating a first search request via a search engine interface; receiving a search result and associated resource types in response to the first search request; mapping the associated resource types to at least one user interface control class of a plurality of user interface control classes resulting in at least one selected class group; dynamically mapping the at least one selected class group to a corresponding instance of user interface controls; rendering the search result and the corresponding instance into a faceted user interface; receiving input via the corresponding instance rendered into the faceted user interface; filtering the search result based on the input to generate a filtered search result; and rendering the filtered search result into the faceted search interface.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein are directed to a system that provides users with a user interface for faceted search that is selected based on the resources being worked with.

In the context of this description, the following conventions, terms and/or expressions may be used:

The term "resource" may denote any element accessible via a network. Examples for resources may comprise text elements, pictures, sound files, video clips, but also other resources like computers, printers, mobile devices and basically any kind of element that may be found by a traditional search engine. A universal resource locator (URL) may represent an address for accesses to the resource.

The term "resource type" may denote a new kind of tag associated with a resource in order to categorize a resource. Resource types may comprise tags like "hotel", "car", "book", "special offer", "journey", "house for rent", or any other mark for a classification or clustering of terms relating to resources. A resource may have more than one associated resource types or none.

The term "search engine interface" may denote a user interface or programming interface via which a search engine may be fed with search terms and/or search requests. A user interface framework or portal engine may receive input from a user and transfer search input for his search request via the search engine interface to a, in particular remote, search engine.

The term "search result" may denote a result delivered back by a search engine in form of, e.g., URLs or other pointers and/or resource fragments identifying resources fitting to a specific search request.

The term "user interface controls" may denote interactive elements in a portal or a portlet adapted to receive user commands. User interface controls may comprise text input fields, sliders with defined limits and defined increment steps, checkboxes, radio buttons, pull down menus, pop-up menus, and so on. Basically, any interactive control, or input, or selection element of a user interface may be used.

The term "instance", in particular an instance of a user interface controller class may denote a manifestation of an abstract group of interactive elements that may be mapped and rendered into a user interface.

The term "communication channel" may denote a data exchange mechanism for transferring data, in particular input data and results, from a user interface, in particular input fields, to a search engine. This way, it may not be required using the standard user interface of the search engine, but use instead an input element of a portal or a portlet within a portal.

The proposed computer implemented method for searching resources via a web application may offer a couple of advantages:

According to one embodiment, the method may comprise additionally, iteratively repeating rendering the search result and rendering the dynamically mapped, corresponding instance of the user interface controls, receiving input, filtering the received search result, and rendering the filtered received search result. This way, a user may interactively adjust the results presented by the search engine. Much of the filter criteria may be adjusted in one step. A user may interactively be guided to an optimal result in respect to his search request, which could not be generated using a standard or conventional user interface of a search engine. A new command to the search engine may not be required. Finally, no command "filter" may be required. The filtered results may change immediately on the display as a user may change filter parameters using the UI (user interface) controls.

According to another embodiment, the method may also comprise defining resource types and associate the resource type to a resource. The resource type may be a new resource type which may be generated as part of the association process or an existing resource type may be used for the assignment. Much of the resource types may be assigned to a singular resource. On the other hand though, one resource type may be associated with different resources. This way, a meaningful grouping of resources available via the web may be achieved. The different resource types may be generated by an administrator, or they may be defined and potentially also rated independently by a peer group, or simply by any user. However, the definition of resource types may be limited to users having access to an administrator's user interface. A database of resource types may also be cleaned-up by an administrator from time to time. Resource types may be managed centrally or decentralized. Resource types may have subcategories of resource types. Thus, a hierarchy of resource types may be generated.

It may be noted that together with the resource type additional metadata for the resource type may be stored. This may be a rating of a user community of the usefulness of the resource type, a counter of a usage of the resource type, a ranking of the resource type in comparison to other resource types and so on.

According to another embodiment of the method, the method may comprise defining at least one class of user interface controls. A class may also comprise only one user interface control. The class of user interface components may be defined for each resource type. The definition may be achieved by rendering a list of resource types and rendering a list of UI control classes and selectively associate a resource with at least one user interface control using an admin user interface. This way, the definition may be performed very easily by point and click techniques.

According to another embodiment, the method may comprise defining default input values for instances of a class of user interface controls based on an associated resource type. In case of alpha-numerical input fields default values may already appear within the input field. A user may not require to type in any input values and just accept the default values. Also lower and upper limits for sliders, checkboxes, radio buttons, geolocators, and so on may be defined as default values. These default values of the user interface controls may be rendered together with rendering the dynamically mapped corresponding instance of user interface controls in a faceted user interface. The geolocators may be instrumental for specifying geographical positions and/or areas on a map.

According to another embodiment, the defining default input values for instances of a class of user interface controls may dynamically be adaptable depending on the content of the search result. This may happen during the rendering. If, for example, default values may have been defined and none of the resources being returned by the search engine may show any values within, for example, a given interval defined for the class of user interface components, the default values may dynamically be adjusted according to the content that may be returned by the search engine. The results may be a better acceptance of the faceted user interface and a higher productivity for users using a related search system.

It may be noted that a traditional user interface for a search engine and a faceted UI for the inventive search system based on the inventive method may be rendered jointly in one screen layout within a portal framework.

It may be noted that for an automatic adjustment, as mentioned above, a content interpretation module may be required relating defined limits for UI controls to the content of the resource. It may be required to have an additional administrator interface components for confirming the newly and automatically adjusted limits for UI controls.

According to another embodiment, the web application may be a portal. Traditional portals may be enhanced by these new techniques using resource types for better interactivity of a faceted user interface for search engines.

In another embodiment, a communication channel may be provided between the user interface framework and the search engine interface. Such a communication channel may be implemented via subroutine, pipes, callable classes, or other programming techniques.

With reference to an embodiment of the search system, an administrative interface unit adapted for defining resource types and for associating a resource type to a resource may be provided. As discussed above, a definition of resource types and its assignment to resources may be restricted to a limited number of people having access to specific functions of the administrative interface.

According to one embodiment, the administration interface unit may also comprise a user interface control definition unit adapted for defining at least one class of user interface controls for each resource type. Such a unit may comprise, e.g., suggestions for resource types and related user interface control classes, and optionally relate to default values.

According to another embodiment, the rendering engine may also be adapted for rendering the faceted search interface and a standard search user interface as one integrated unit. The rendering may be performed to a joint portlet for a seamless user experience. A user may not recognize the hidden, sophisticated techniques as part of the user interface framework delivering a higher productivity when interacting with the faceted user interface of the search system.

According to one embodiment of the present invention, a computer implemented method for searching resources via an application in a user interface framework includes initiating a first search request via a search engine interface; receiving a search result and associated resource types in response to the first search request; mapping the associated resource types to at least one user interface control class of a plurality of user interface control classes resulting in at least one selected class group; dynamically mapping the at least one selected class group to a corresponding instance of user interface controls; rendering the search result and the corresponding instance into a faceted user interface; receiving an input via the corresponding instance rendered into the faceted user interface; filtering the search result based on the input to generate a filtered search result; and rendering the filtered search result into the faceted search interface.

In some embodiments of the method, the method may further include iteratively repeating: rendering the search result and the corresponding instance; receiving the input; filtering the search result; and rendering the filtered search result.

In some embodiments of the method, the method may further comprise defining a plurality of resource types; and associating each resource type of the plurality of resource types to a resource to generate the associated resource types.

In some embodiments of the method, the method may further comprise defining at least one user interface control class of the plurality of user interface control classes for each resource type of the plurality of resource types.

In some embodiments of the method, the method may further comprise defining default input values for each instance of the plurality of user interface control classes based on a corresponding resource type.

In some embodiments of the method, the defining of the default input values may be dynamically adaptable in accordance with a content of the search result.

In some embodiments of the method, the application may include a web portal.

In some embodiments of the method, the method may further comprise providing a communication channel between the user interface framework and the search engine interface.

According to another embodiment of the present invention, a system for searching resources via an application in a user interface framework, comprising a processing unit and a memory, is configured to initiate a first search request via a search engine interface; receive a search result and associated resource types in response to the first search request; map the associated resource types to at least one user interface control class of a plurality of user interface control classes resulting in at least one selected class group; dynamically map the at least one selected class group to a corresponding instance of user interface controls; render the search result and the corresponding instance into a faceted user interface; receive an input via the corresponding instance rendered into the faceted user interface; filter the search result based on the input to generate a filtered search result; and render the filtered search result into the faceted search interface.

In some embodiments of the system, the system may further be configured to define a plurality of resource types; and associate each resource type of the plurality of resource types to a resource to generate the associated resource types.

In some embodiments of the system, the system may further be configured to define at least one user interface control class of the plurality of user interface control classes for each resource type of the plurality of resource types.

In some embodiments of the system, the system may further be configured to render the faceted search interface and a standard search user interface as one integrated unit.

According to another embodiment of the present invention, a computer program product for searching resources via an application in a user interface framework, comprises a computer readable storage medium having program instructions embodied therewith, where the program instructions are executable by a processor and cause the computer to perform initiating a first search request via a search engine interface; receiving a search result and associated resource types in response to the first search request; mapping the associated resource types to at least one user interface control class of a plurality of user interface control classes resulting in at least one selected class group; dynamically mapping the at least one selected class group to a corresponding instance of user interface controls; rendering the search result and the corresponding instance into a faceted user interface; receiving input via the corresponding instance rendered into the faceted user interface; filtering the search result based on the input to generate a filtered search result; and rendering the filtered search result into the faceted search interface.

In some embodiments of the computer program product, the program instructions may by further executable by the processor to cause an iteratively repeating of rendering the search result and the corresponding instance; receiving the input; filtering the search result; and rendering the filtered search result.

In some embodiments of the computer program product, the program instructions may by further executable by the processor to cause a defining of a plurality of resource types; and associating each resource type of the plurality of resource types to a resource to generate the associated resource types.

In some embodiments of the computer program product, the program instructions may by further executable by the processor to cause a defining of at least one user interface control class of the plurality of user interface control classes for each resource type of the plurality of resource types.

In some embodiments of the computer program product, the program instructions may by further executable by the processor to cause a defining of default input values for each instance of the plurality of user interface control classes based on a corresponding resource type.

In some embodiments of the computer program product, the defining of the default input values is dynamically adaptable in accordance with a content of the search result.

In some embodiments of the computer program product, the application may include a web portal.

In some embodiments of the computer program product, the program instructions may by further executable by the processor to cause a providing of a communication channel between the user interface framework and the search engine interface.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), digital video disk (DVD), and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the inventive computer implemented method for searching resources via a web application is given. Afterwards, further embodiments of the method and the search system will be described.

Figure 1:
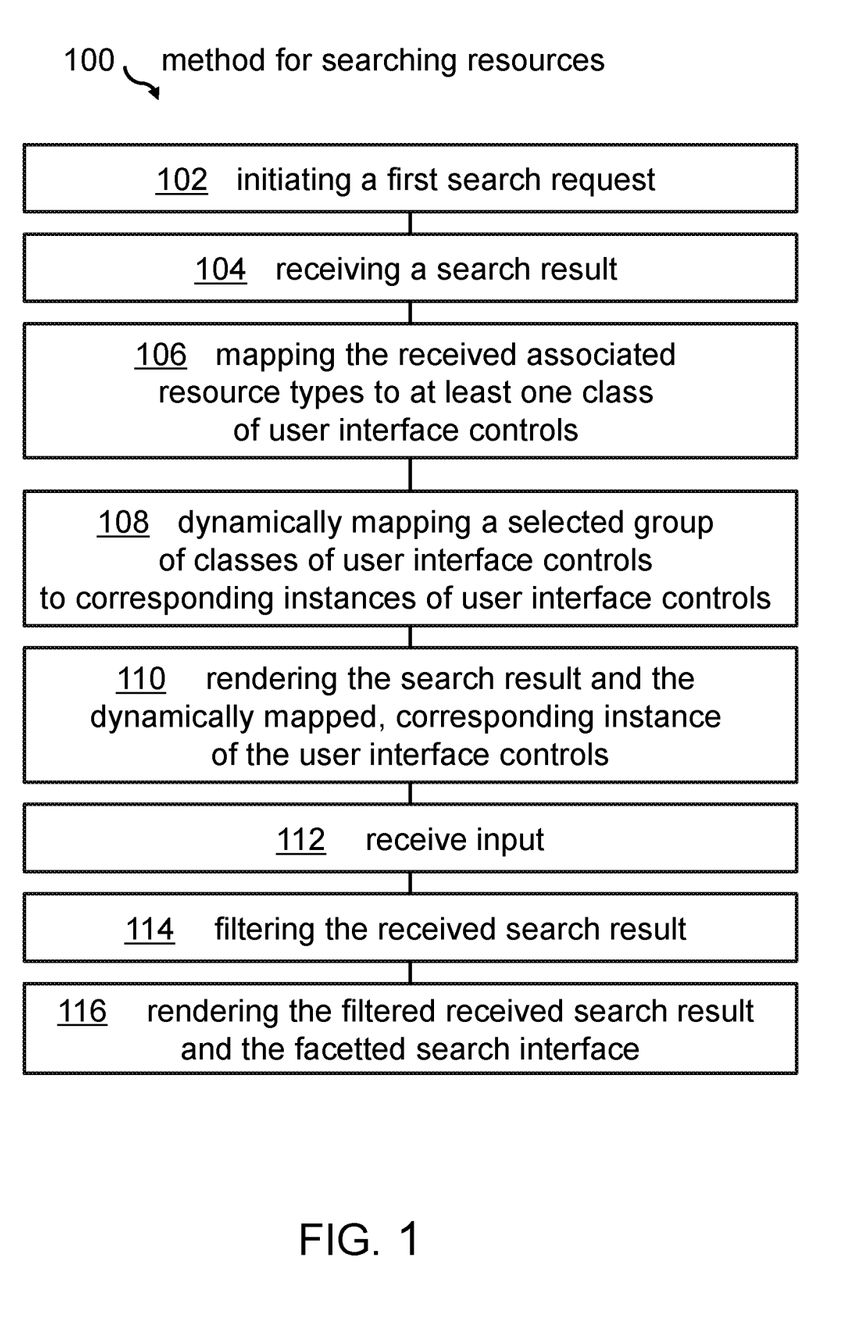
FIG. 1 illustrates a block diagram of an embodiment of the inventive method for searching resources.

Referring to FIG. 1, a block diagram of the computer implemented method 100 for searching resources via a web application, in particular a portal, in a user interface framework as shown. A resource may be associated with at least one resource type. Resource types may span a variety of different expressions, like, e.g., hotel, movie, flight, city, car, government, actors, artists, painters, bar, specialty shop and so on. Basically, every expression instrumental for categorizing or clustering search results of a search engine may be used. Resource types may be managed centrally, e.g., by an operator of a search engine, or decentralized by a user community. Also a $3^{rd}$ party may perform the resource type management task.

As shown, the method may comprise a couple of activities: firstly, a first search request may be initialized, 102, via a traditional search engine interface, e.g., a simple text input field. A related search request may be executed by a traditional, remote search engine.

Next, search results based on the first search request may be received, 104. As already explained above, the search results may be identifiable by a URL. Alternatively, other type of pointers to the resources may be used.

Additionally, the received associated resource types may be mapped, 106, to at least one class of user interface controls resulting in at least one selected group of classes of user interface controls. Note that the at least one selected group of classes of user interface controls may be dynamically mapped, 108, to corresponding instances of user interface controls. The selected group of user interface controls may comprise one or more elements. There may be a one-to-one relationship between a class of user interface controls and a corresponding instance of user interface controls.

Moreover, the search result and the dynamically mapped, corresponding instance of the user interface controls may be rendered, 110, into a faceted user interface to be used by a user. The method may also comprise receiving input, 112, via the rendered, dynamically mapped instances of the user interface controls, and may use related input values for a filtering, 114, the received search result based on the received input to the dynamically mapped, corresponding instance of the user interface controls.

Last but not least the filtered received search result and the faceted search interface may be rendered, 116, into an integrated screen element, e.g., a portlet, of a related portal.

Figure 2:
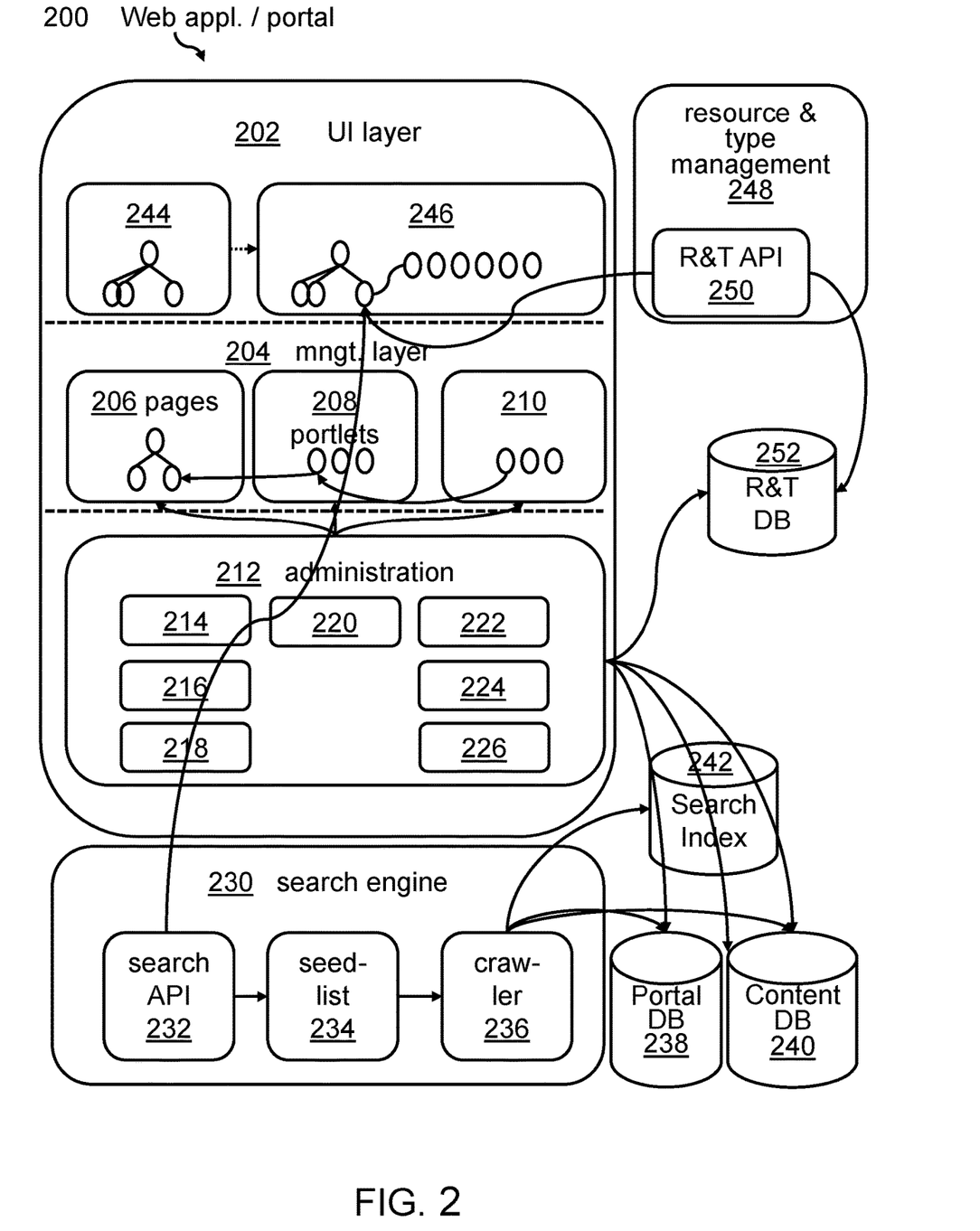
FIG. 2 illustrates a block diagram of an embodiment of elements of a traditional portal framework with additional elements for executing the inventive method for searching resources.

FIG. 2 shows a block diagram an embodiment of elements of a traditional portal framework or portal engine or simply portal 200 with additional elements for executing the inventive method for searching resources. Firstly, elements and functions of a traditional web application or portal 200 may be described briefly. The portal 200 may have three layers. A top layer or user interface layer 202 comprising basically a search center (not shown) for inputting of a search expression resulting in a search center with results (not shown).

A middle layer or management layer 204 may comprise pages 206, portlets 208 and cached content 210 or resources. In a traditional portal framework, the content 210 may not comprise any resource types. An administration layer 212 may comprise components for managing pages 214, access control 216, deployment 218, and content management 220. Furthermore, a traditional a search environment may comprise additionally a search engine 230, comprising a search API 232 (application programming interface), a seed list 234, and a crawler 236. A portal database 238 and one or more content databases 240 may be accessed using a search index 242. A typical data flow between the various elements is known by a skilled person and some data flows are highlighted by arrows in the figure.

The inventive search method may comprise a couple of more elements. Instead of the traditional search center 244 and the search center results, a new type of search center, namely a faceted search center 246, may be required. In the middle layer 204 of the portal 200, content 210, including resource types, may be cached.

Additional elements in the administration layer 212 comprise a resource management with resource types 222, a resource type management 224, and a user interface control definition unit 226, also denoted as user interface control management unit. The resource and type management component 248 may require a resource and type API 250 (application programming interface) with access to a resource and type database 252 for storing associations and/or relationships between resources and resource types. The resource and resource type database 252 may be external to the portal 200 and may comprise the resource and type management component 248 with a respective application programming interface 250.

Figure 3:
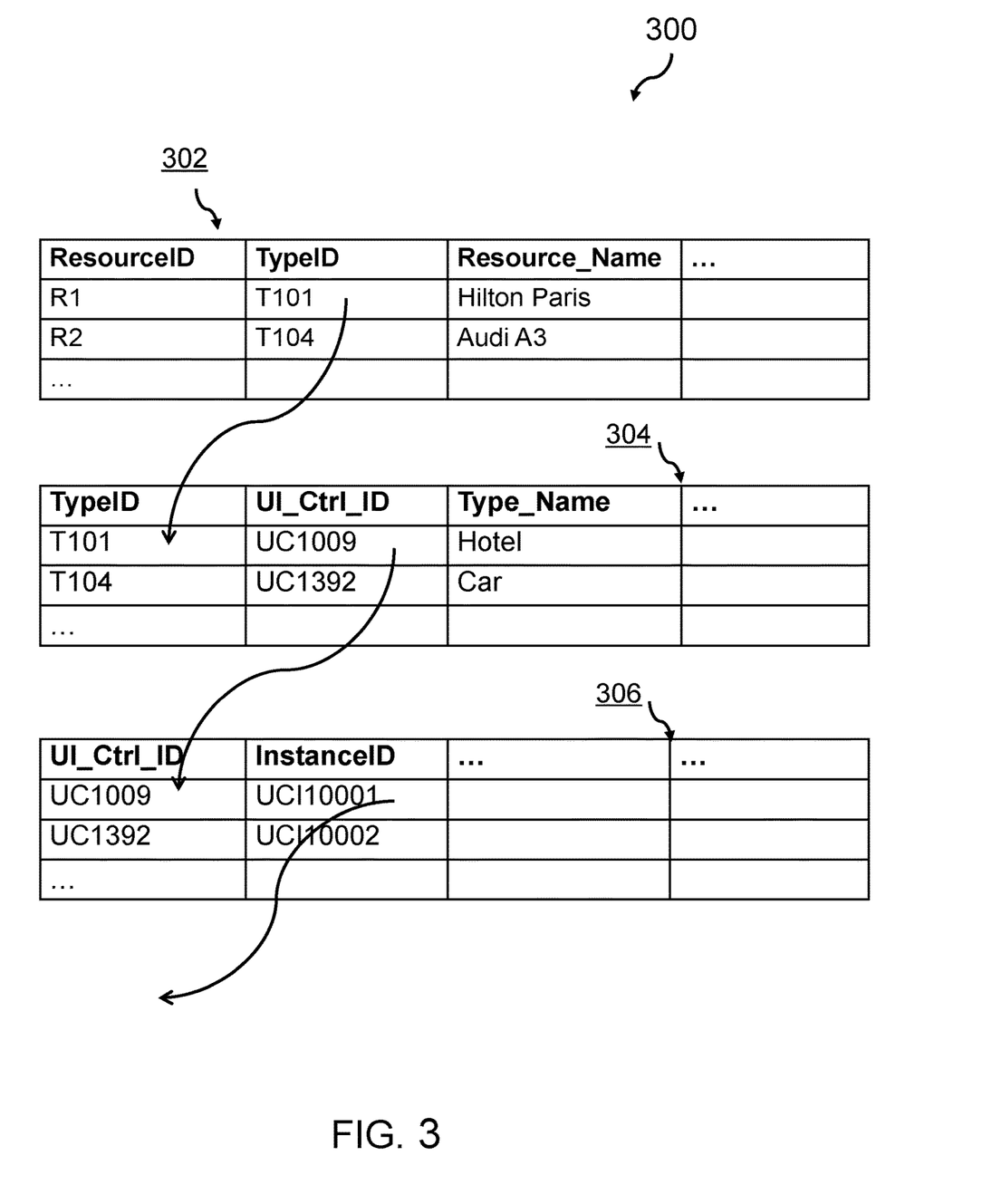
FIG. 3 illustrates a block diagram of an embodiment of linking resource types, classes and instances of user interface controls.

FIG. 3 shows a block diagram of an embodiment 300 of a way for linking resource types, classes and instances of user interface controls. At least three tables 302, 304, and 306 may be used for a management of resources having a resourceID and one or more resource types identifiable by a TypeID. Also the Resource_Name and potentially other describing elements, e.g., a corresponding URL, may be comprised in a record of such a table 302. In the sample, the resource with the identifier R1 is associated with type T101.

The TypeID may point to an entry in a second table 304, in which a relationship between a TypeID and a user interface control identifier (UI-Ctrl-ID) may be stored. The UI-Ctrl-ID table 304 posts a list of all registered UI controls—being administered by the user interface control management component 226. It associates each single UI control class with one (or more) concrete user interface controller instance(s). In the sample, the user interface control with identifier UC1009 is associated with the user interface control instance UCI10001. In additional tables (not shown) concrete configuration data for single user interface control instances may be stored. Thus, the UI-Ctrl-ID may point to an entry in a third table 306, in which UI-Ctrl-IDs and instances of user interface control identifiers may be stored. Each InstanceID may further point to another table (not shown) in which a specific instance of user interface controls and respective parameters may be stored. All of this may be stored in the resource and resource type database 252 as discussed above.

Figure 4:
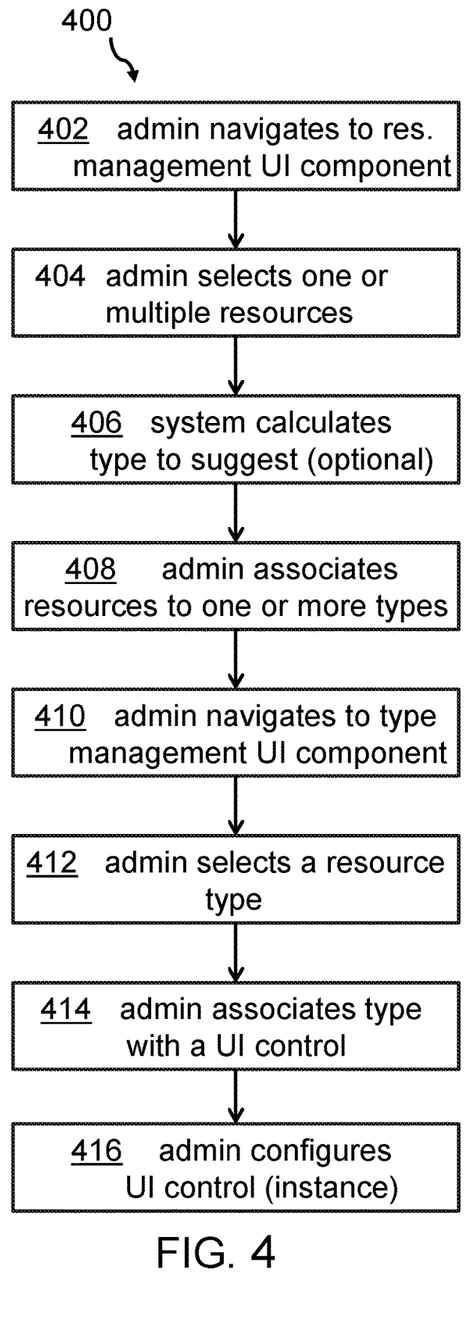
FIG. 4 illustrates a block diagram of a navigation flow of a portal framework in accordance with an embodiment.

FIG. 4 shows a block diagram 400 of a navigation flow of a portal framework. The administrator may navigate in the portal framework 200 to the resource management 222 user interface component, 402. He may select one or more resources, 404. Optionally, a related search system may calculate a suggested resource type, 406. At 408, the administrator may associate a resource to one or more resource types. The administrator may choose to make more than one associations. At 410, the administrator may navigate to the resource type management user interface component 248. At 412, the administrator may select a resource type, and he may, at 414, associate a resource type with a concrete user interface control, which may then be configured at 416.

Figure 5:
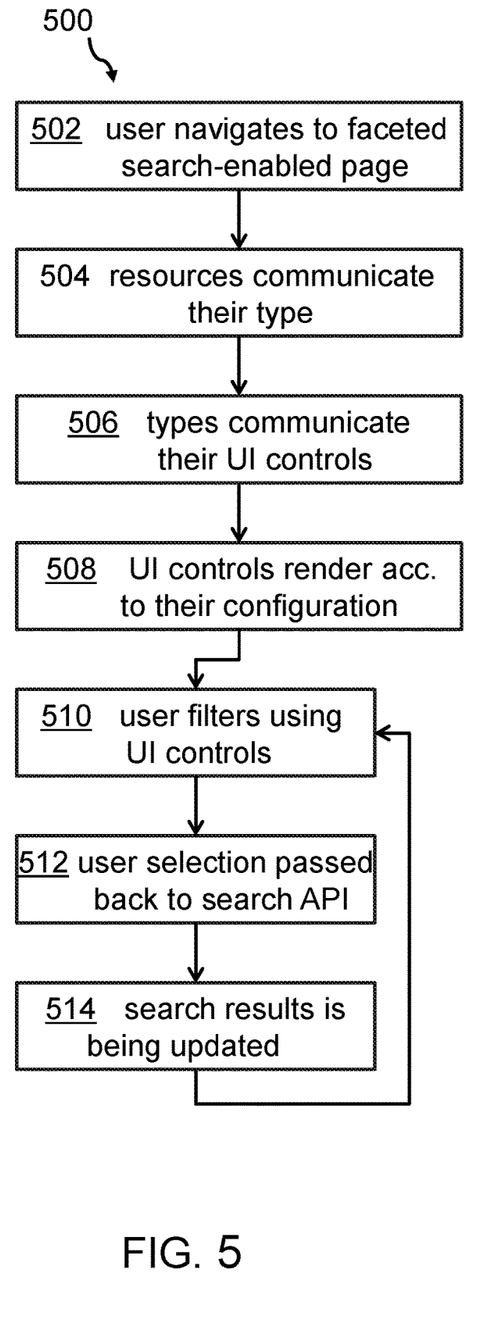
FIG. 5 illustrates a block diagram of a flow of rendering a user interface in accordance with an embodiment.

FIG. 5 shows a block diagram 500 of a flow of rendering a user interface. At 502, a user may navigate to a faceted search-enabled page of the portal 200. A search resource may communicate to the portal framework 200 a respective resource type at 504. At 506, their respective resource types may communicate related user interface controls. These user interface controls may then be rendered according to the configuration and together with search results at 508. The user may then command a related search system to filter the search results using the user interface controls at 510. The user selection, 512, may be passed back to a search API for rendering the search results in an update to perform, at 514, based on the input received by the user interface controls.

Figure 8:
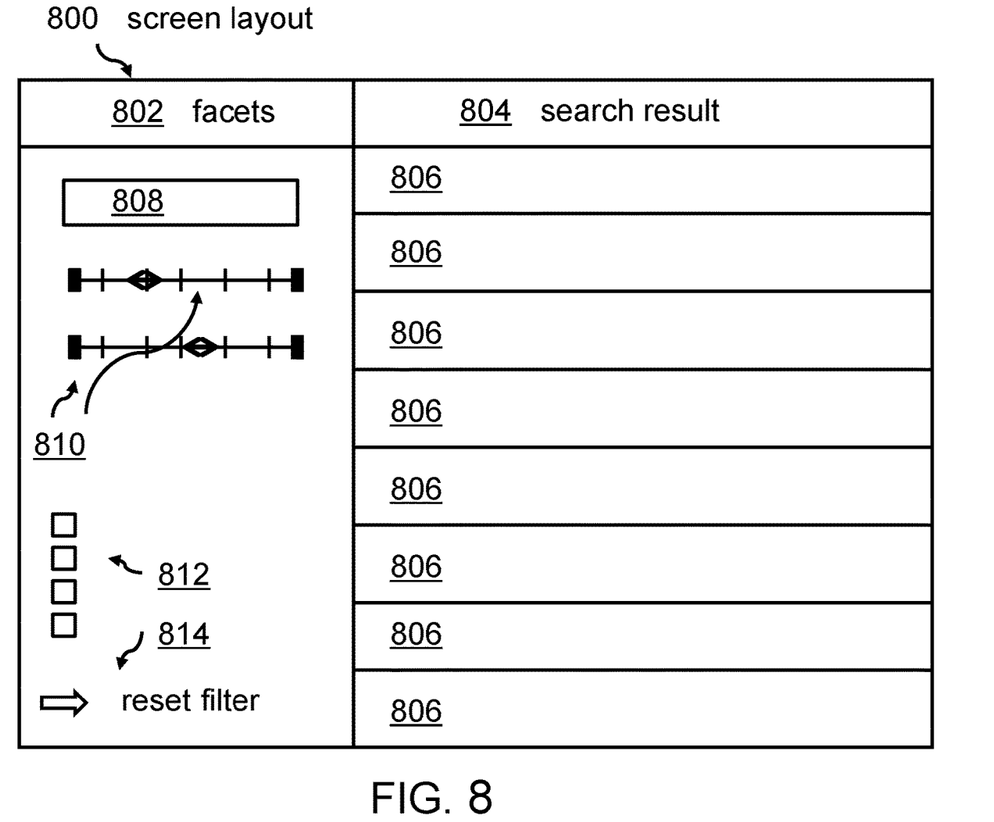
FIG. 8 illustrates an exemplary block diagram of a screen layout comprising an integrated traditional input field for a search engine and a faceted user interface in accordance with an embodiment.

FIG. 8 shows an exemplary block diagram of a screen layout 800 comprising an integrated traditional input field 808 for a search engine and a faceted user interface 802 comprising also an integrated traditional search input field 808. On the right side of the screen layout 800, search results 804 are shown as individual rows 806.

The faceted user interface 802 on the left side comprise, besides the integrated traditional input field 808 for a search engine, potentially one or more user interface controls in form of sliders 810, checkboxes 812, and an optional reset filter button 814. Clicking on this research with the button 814, the faceted user interface control default values may again be shown. In addition to user interface controls, e.g., alpha-numeric input fields, or other control elements, may be available in the faceted user interface 802. The search system 700 may also comprise an administrative interface unit instrumental for a user interaction using an administrative interface 900 (compare FIG. 9).

Figure 9:
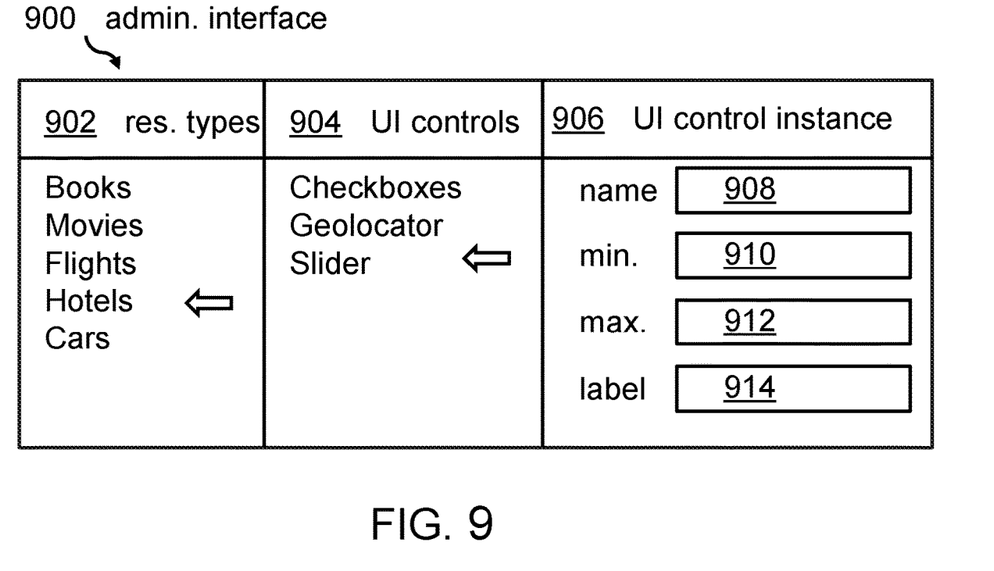
FIG. 9 illustrates an exemplary block diagram of a screen layout for an administrator in accordance with an embodiment.

FIG. 9 shows an exemplary block diagram of a screen layout 900 for an administrator. The screen layout 900 is split into three columns. They may comprise a list of resource types 902, a list of user interface control classes 904, and instances of user interface controls 906. Firstly, an administrator may create or select from a proposed list a resource type 902 (selection is shown by an arrow). Based on the selection, the administrator's interface may show classes of user interface controls 904. In the current example, the administrator may choose the class "Slider" (selection is shown by an arrow). Then, a concrete instance of user interface controls 906 may be displayed for which the administrator may then define default values. In the sample shown, in name field 908, a minimum value 910, a maximum value 912, and a label 914 may be set by the administrator.

Referring back to FIG. 8 these concrete values 908, 910, 912 and 914 may be used for the slider 810. Some of the selection and association procedures may be performed for other types of user interface control classes 904.

Figure 6:
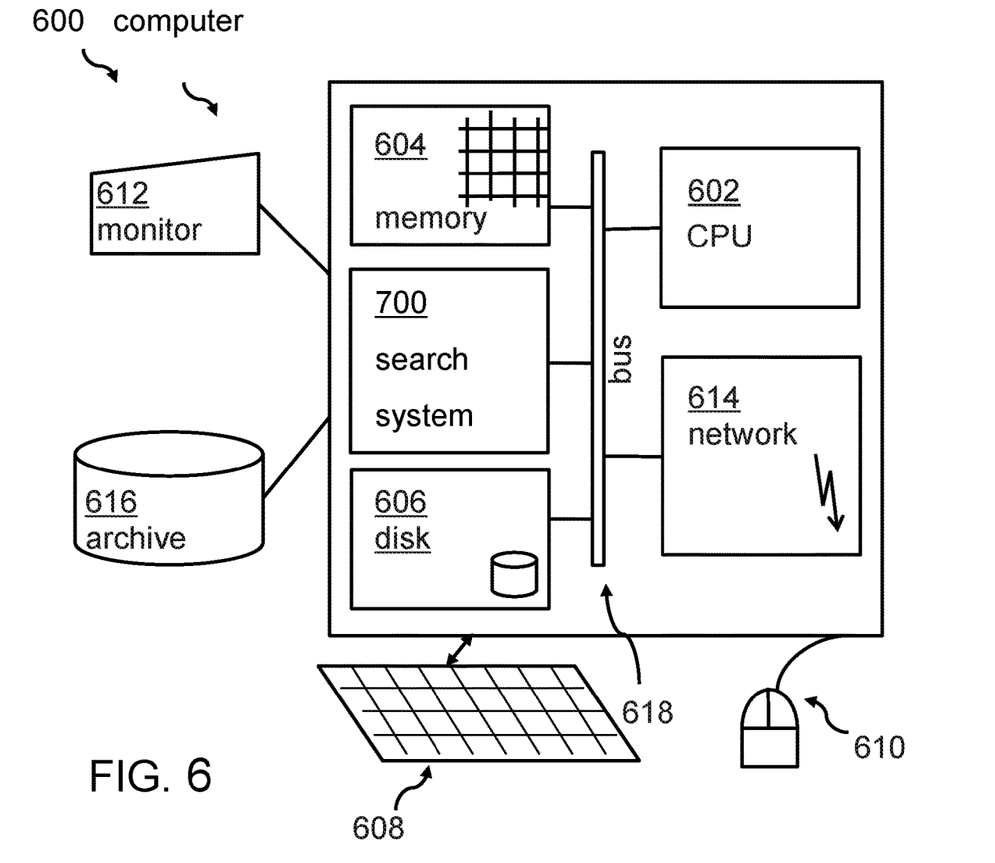
FIG. 6 illustrates a block diagram of a computing system comprising the inventive search system.

FIG. 6 shows a block diagram of a computing system 600 comprising the inventive search system 700.

Figure 7:
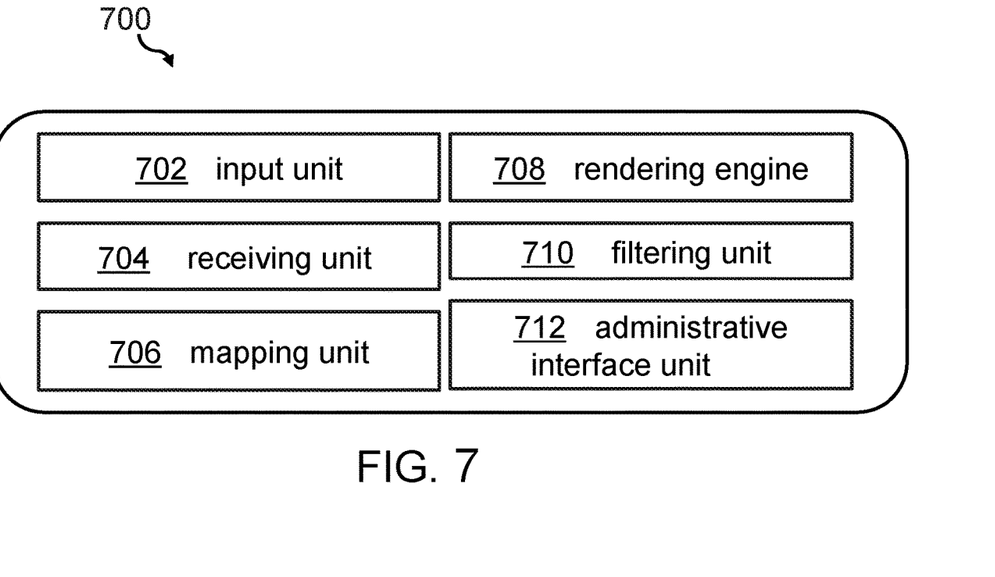
FIG. 7 illustrates a block diagram of components of an embodiment of the inventive search system.

Referring now to FIG. 7, the search system 700 for searching resources via a web application or portal 200 in a user interface framework may comprise a processing unit 602 and a memory 604 (compare FIG. 6). The resource may be associated with at least one resource type. The system may comprise an input unit 702 adapted for receiving search input for initiating a first search request via a search engine interface, and a receiving unit 704 adapted for receiving a search result based on the first search request and receiving associated resource types for a search engine 230.

The search system 700 may further comprise a mapping unit 706 adapted for mapping the received associated resource types 902 to at least one class of user interface controls 904 resulting in at least one selected group of classes of user interface controls 904. The at least one selected group of user interface controls 904 may dynamically be mapped to a corresponding instance of user interface controls 906. Furthermore, the search system 700 may comprise a rendering engine 708 adapted for rendering the search result and rendering the dynamically mapped, corresponding instance of the user interface controls 906 into a faceted user interface 802. The input unit 702 may further be adapted for receiving input via the rendered, dynamically mapped, corresponding instance of the user interface controls 906, 802, 808, 810, 812, 814. A filtering unit 710 may be adapted for filtering the received search result 806 based on the received input to the dynamically mapped, corresponding instance of the user interface controls 906, and the rendering engine 706 may further be adapted for rendering the filtered received search result, also 804, 806, together with the faceted search interface 802.

Embodiments herein may be implemented together with virtually any type of computer, regardless of the platform being suitable for storing and/or executing program code. For example, as shown in FIG. 6, a computing system 600 may include one or more processor(s) 602 with one or more cores per processor, associated memory elements 604, an internal storage device 606 (e.g., a hard disk, an optical drive such as a compact disk drive or DVD drive, a flash memory stick, a solid-state disk, etc.), and numerous other elements and functionalities, typical of today's computers (not shown). The memory elements 604 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 616 for an execution. Elements inside the computer 600 may be linked together by means of a bus system 618 with corresponding adapters. Additionally, the search system 700 may be attached to the bus system 618. Actually, the CPU 602 and memory 604, as well as other components of the computing system 600, may also be used by, or shared with, the search system 700.

The computing system 600 may also include input means, such as a keyboard 608, a pointing device such as a mouse 610, or a microphone (not shown). Alternatively, the computing system may be equipped with a touch sensitive screen as main input device. Furthermore, the computer 600, may include output means, such as a monitor or screen 612 [e.g., a liquid crystal display (LCD), a plasma display, a light emitting diode display (LED), or cathode ray tube (CRT) monitor]. The computer system 600 may be connected to a network (e.g., a local area network (LAN), a wide area network (WAN), such as the Internet or any other similar type of network, including wireless networks via a network interface connection 614. This may allow a coupling to other computer systems or a storage network or a tape drive. Those, skilled in the art will appreciate that many different types of computer systems exist, and the aforementioned input and output means may take other forms. Generally speaking, the computer system 600 may include at least the minimal processing, input and/or output means, necessary to practice embodiments of the invention.

In addition to the above, searching resources via an application may be embodied in a computer implemented method, a search system, a computing system, a data processing program, and/or a computer program product, according to the independent claims.

According to one aspect, a computer implemented method for searching resources via a web application in a user interface framework may be provided. A resource may be associated with at least one resource type, and the method may comprise initiating a first search request via a search engine interface, and receiving a search result based on the first search request and receiving associated resource types.

The received associated resource types may be mapped to at least one class of user interface controls resulting in at least one selected group of classes of user interface controls. The at least one selected group of classes of user interface controls may dynamically be mapped to a corresponding instance of user interface controls.

The search result and the dynamically mapped, corresponding instances of the user interface controls may be rendered into a faceted user interface. Input, in particular from a user, may be received via the rendered, dynamically mapped instances of the user interface controls.

The received search result may be filtered based on the received input to the dynamically mapped, corresponding instance of the user interface controls, and the filtered received search result, and the faceted search interface may be rendered, in particular jointly.

According to another aspect, a search system for searching resources via a web application in a user interface framework may be provided. The system may comprise a processing unit (e.g., CPU) and a memory. Also here, a resource may be associated with at least one resource type. The search system may comprise several units and/or engines:

An input unit may be adapted for receiving search input for initiating a first search request via a search engine interface.

A receiving unit may be adapted for receiving a search result based on the first search request and receiving associated resource types, in particular from a search engine.

A mapping unit may be adapted for mapping the received associated resource types to at least one class of user interface controls resulting in at least one selected group of classes of user interface controls, wherein the at least one selected group of classes of user interface controls may be dynamically mapped to a corresponding instances of user interface controls.

A rendering engine may be adapted for rendering the search result and rendering the dynamically mapped, corresponding instance of the user interface controls into a faceted user interface, wherein the input unit may further be adapted for receiving input via the rendered, dynamically mapped, corresponding instance of the user interface controls.

A filtering unit may be adapted for filtering the received search result based on the received input to the dynamically mapped, corresponding instance of the user interface controls, wherein the rendering engine may further be adapted for rendering the filtered received search result together with the faceted search interface.

It may be noted that the web application in the user interface framework may be a portal and that the first search request may be executed by a remote search engine. The resource type that may be mapped to a resource may or may not exist and multiple resource types may be assigned to one or more resource(s) Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

What is claimed is:

1. A computer implemented method for searching resources via an application in a user interface framework, the method comprising:
   initiating a first search request via a search engine interface;
   receiving a search result and associated resource types in response to the first search request;
   mapping the associated resource types to at least one user interface control class of a plurality of user interface control classes resulting in at least one selected class group;
   dynamically mapping the at least one selected class group to a corresponding instance of user interface controls;
   defining default input values for each instance of the plurality of user interface control classes based on a corresponding resource type, wherein the defining of the default input values is dynamically adaptable in accordance with a content of the search result that reflect changes and one or more user interface slider controls;
   rendering the search result and the corresponding instance into a faceted user interface;
   receiving an input via the corresponding instance rendered into the faceted user interface;
   filtering the search result based on the input to generate a filtered search result; and
   rendering the filtered search result into the faceted search interface.

2. The method according to claim 1, further comprising:
   iteratively repeating:
      rendering the search result and the corresponding instance;
      receiving the input;
      filtering the search result; and
      rendering the filtered search result.

3. The method according to claim 1, further comprising:
   defining a plurality of resource types; and
   associating each resource type of the plurality of resource types to a resource to generate the associated resource types.

4. The method according to claim 3, further comprising:
   defining at least one user interface control class of the plurality of user interface control classes for each resource type of the plurality of resource types.

5. The method according to claim 1, further comprising:
   rendering the faceted search interface and a standard search user interface as one integrated unit.

6. The method according to claim 1, wherein the application is a web portal.

7. The method according to claim 1, further comprising:
   providing a communication channel between the user interface framework and the search engine interface.

8. A system for searching resources via an application in a user interface framework, the system comprising a hardware processing unit and a memory, the system configured to:
   initiate a first search request via a search engine interface;
   receive a search result and associated resource types in response to the first search request;
   map the associated resource types to at least one user interface control class of a plurality of user interface control classes resulting in at least one selected class group;
   dynamically map the at least one selected class group to a corresponding instance of user interface controls;
   define default input values for each instance of the plurality of user interface control classes based on a corresponding resource type, wherein the defining of the default input values is dynamically adaptable in accordance with a content of the search result that reflect changes and one or more user interface slider controls;
   render the search result and the corresponding instance into a faceted user interface;
   receive an input via the corresponding instance rendered into the faceted user interface;
   filter the search result based on the input to generate a filtered search result; and
   render the filtered search result into the faceted search interface.

9. The system according to claim 8, the system further configured to:
 iteratively repeat:
  rendering the search result and the corresponding instance;
  receiving the input;
  filtering the search result; and
 render the filtered search result.

10. The system according to claim 8, the system further configured to:
 define a plurality of resource types; and
 associate each resource type of the plurality of resource types to a resource to generate the associated resource types.

11. The system according to claim 10, the system further configured to:
 define at least one user interface control class of the plurality of user interface control classes for each resource type of the plurality of resource types.

12. The system according to claim 8, the system further configured to:
 render the faceted search interface and a standard search user interface as one integrated unit.

13. The system according to claim 8, wherein the application is a web portal.

14. The system according to claim 8, the system further configured to:
 provide a communication channel between the user interface framework and the search engine interface.

15. A computer program product for searching resources via an application in a user interface framework, the computer program product comprising a computer readable storage medium having program instructions embodied therewith, the program instructions executable by a processor to cause the processor to perform:
 initiating a first search request via a search engine interface;
 receiving a search result and associated resource types in response to the first search request;
 mapping the associated resource types to at least one user interface control class of a plurality of user interface control classes resulting in at least one selected class group;
 dynamically mapping the at least one selected class group to a corresponding instance of user interface controls;
 defining default input values for each instance of the plurality of user interface control classes based on a corresponding resource type, wherein the defining of the default input values is dynamically adaptable in accordance with a content of the search result that reflect changes and one or more user interface slider controls;
 rendering the search result and the corresponding instance into a faceted user interface;
 receiving input via the corresponding instance rendered into the faceted user interface;
 filtering the search result based on the input to generate a filtered search result; and
 rendering the filtered search result into the faceted search interface.

16. The computer program product according to claim 15, wherein the program instructions are further executable by the processor to cause:
 iteratively repeating:
  rendering the search result and the corresponding instance;
  receiving the input;
  filtering the search result; and
  rendering the filtered search result.

17. The computer program product according to claim 15, wherein the program instructions are further executable by the processor to cause:
 defining a plurality of resource types; and
 associating each resource type of the plurality of resource types to a resource to generate the associated resource types.

18. The computer program product according to claim 17, wherein the program instructions are further executable by the processor to cause:
 defining at least one user interface control class of the plurality of user interface control classes for each resource type of the plurality of resource types.

19. The computer program product according to claim 15, wherein the program instructions are further executable by the processor to cause:
 rendering the faceted search interface and a standard search user interface as one integrated unit.

20. The computer program product according to claim 15, wherein the application is a web portal.

* * * * *